United States Patent [19]

Remsnyder et al.

[11] 4,164,644
[45] Aug. 14, 1979

[54] PORTABLE ELECTRICAL HEATING UNIT WITH AUTOMATIC CUTOFF

[75] Inventors: Duane C. Remsnyder, La Jolla; Clarence C. Haynes, Escondido, both of Calif.

[73] Assignee: Courtesy Interstate Corporation, San Diego, Calif.

[21] Appl. No.: 931,470

[22] Filed: Aug. 7, 1978

[51] Int. Cl.² ........................................... F27D 11/02
[52] U.S. Cl. ..................................... 219/433; 219/430; 219/436; 219/432; 219/441; 219/455; 219/518
[58] Field of Search ............... 219/421, 422, 430, 432, 219/433, 434, 435, 436, 439, 441, 442, 449, 451, 452, 518

[56] References Cited

U.S. PATENT DOCUMENTS

| | | | |
|---|---|---|---|
| 1,650,999 | 11/1927 | Preston | 219/432 |
| 1,961,756 | 6/1934 | French | 219/430 |
| 2,360,691 | 10/1944 | Kuhn et al. | 219/421 |
| 2,422,580 | 6/1947 | Meier | 219/433 |
| 2,520,788 | 8/1950 | Wales | 219/441 |
| 2,702,336 | 2/1955 | Wagner et al. | 219/433 |
| 3,004,131 | 10/1961 | Gilissen | 219/455 |
| 3,315,064 | 4/1967 | Carlberg et al. | 219/518 |
| 3,328,561 | 6/1967 | Sakamoto et al. | 219/442 |
| 3,610,884 | 10/1971 | Evans | 219/439 |
| 3,760,149 | 9/1973 | Harsanyi | 219/518 X |

FOREIGN PATENT DOCUMENTS

| | | | |
|---|---|---|---|
| 2216785 | 4/1972 | Fed. Rep. of Germany | 219/433 |
| 877564 | 9/1942 | France | 219/433 |
| 301617 | 12/1928 | United Kingdom | 219/433 |
| 394873 | 7/1933 | United Kingdom | 219/433 |
| 743183 | 1/1956 | United Kingdom | 219/422 |

Primary Examiner—Volodymyr Y. Mayewsky
Attorney, Agent, or Firm—Brown & Martin

[57] ABSTRACT

A heating unit for heating the contents of a container includes an electrical circuit having a pressure responsive switch that is normally open and a thermally responsive switch that is normally closed, the pressure switch is responsive to a predetermined weight of the container on a pivotally mounted heating element for activating the switch to the closed position for activating the heating circuit. The thermal switch is responsive to an overheating of the unit to interrupt the circuit. The heating unit is provided with a heating element having a conical center portion surrounded by an annular flat or planar surface, for receiving containers having only a predetermined shaped bottom for accommodating the particular shape of the heating element.

6 Claims, 6 Drawing Figures

U.S. Patent  Aug. 14, 1979  Sheet 1 of 2  4,164,644
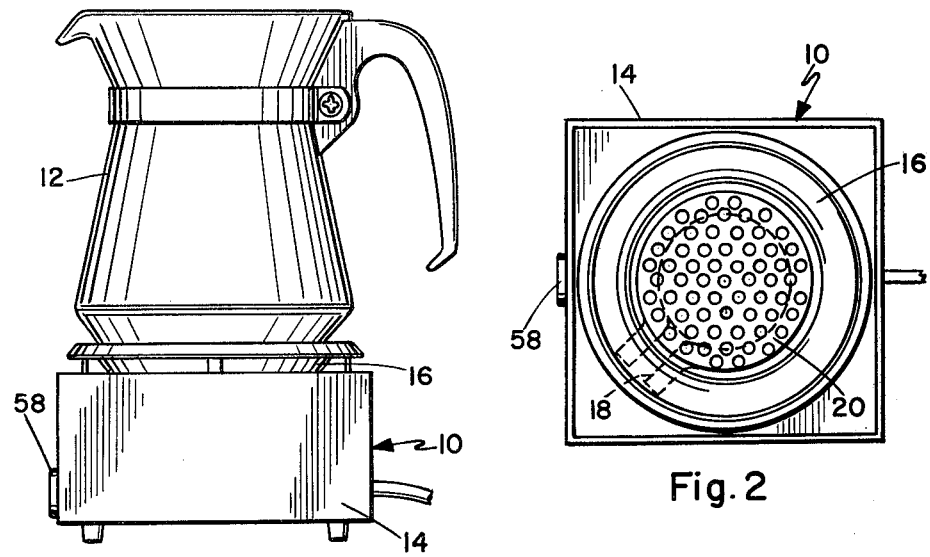
Fig. 1
Fig. 2
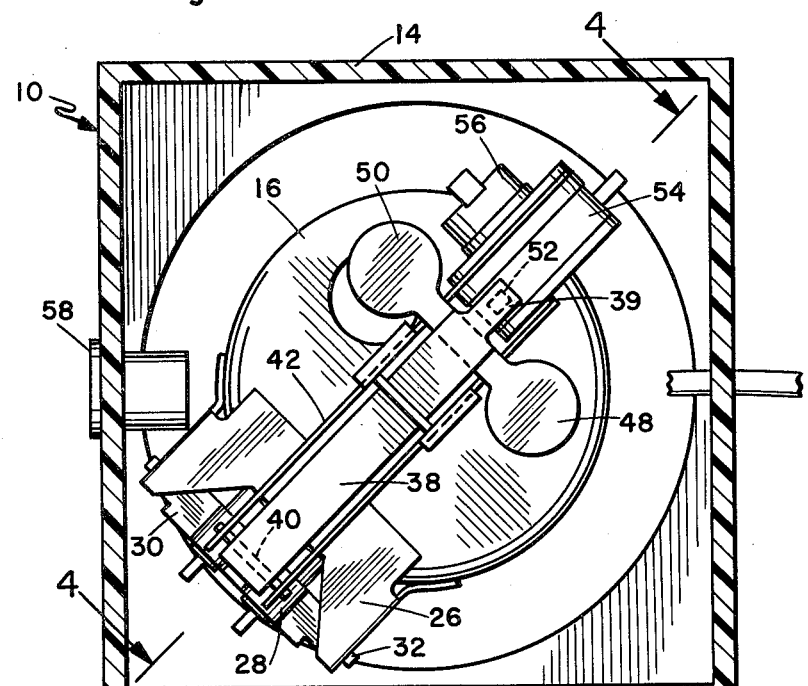
Fig. 3

PORTABLE ELECTRICAL HEATING UNIT WITH AUTOMATIC CUTOFF

BACKGROUND OF THE INVENTION

The present invention relates to heating units and pertains particularly to an electrical heating unit having both weight responsive and thermally responsive control for the circuit.

Electrical heating units for heating coffee pots and the like and having a pressure responsive switch responsive to a coffee pot having a predetermined amount of contents for activating the circuit have been known for some time. Such heating units have circuits which are activated only when a predetermined minimal amount of water or coffee or other liquid is contained within the pot. When the contents of the pot falls below a certain minimum amount, such as one cup or the like, the circuit will be interrupted. Such heaters are relatively safe and trouble free when properly used. However, it has been found that when a person desired to heat less than the minimal amount of liquid necessary to activate the circuit, the tendency is to put a weight such as a book or the like on the pot to weight it down. Should the individual forget the unit and the pot runs dry, the unit could overheat and cause a fire.

It has also been found that an individual may have a tendency to use a pot or container that is not properly suited to use on the heating unit. The container, for example, may have sufficient weight to activate the circuit without the presence of liquid therein. This again can cause a hazardous situation. Other containers such as cups not suitable for heating are also sometimes used. This can also be hazardous.

Accordingly, it is desirable that a heating unit be available which discourages the use of other than an appropriate container and also is responsive to cut off the unit should the weight responsive control fail.

SUMMARY AND OBJECTS OF THE INVENTION

It is accordingly the primary object of the present invention to overcome the above problems of the prior art.

It is another object of the present invention to provide a heating unit having multiple safety cutoff means.

A further object of the present invention is to provide a heating unit having a combination of a weight responsive control and a thermally responsive control for controlling the heating element of the unit.

In accordance with the primary aspect of the present invention, a heating unit includes a circuit having a weight responsive switch normally open and responsive to the weight of a material to be heated for activating the circuit and the normally closed thermal switch, which is responsive to an overheating of the unit to interrupt the electrical circuit.

BRIEF DESCRIPTION OF THE DRAWING

The above and other objects and advantages of the present invention will become apparent from the following description when read in conjunction with the drawings, wherein:

FIG. 1 is a side elevational view of the heater with a pot in place.

FIG. 2 is a top plan view of the heater unit.

FIG. 3 is an enlarged underside view with the bottom of the housing cut away.

DETAILED DESCRIPTION OF A PREFERRED EMBODIMENT

Figure 4:
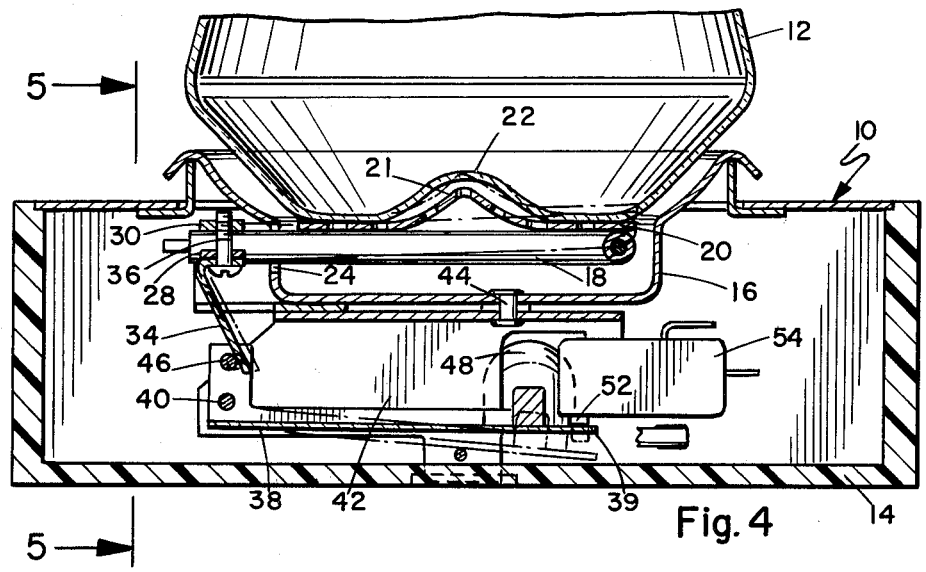
FIG. 4 is a sectional view taken on line 4—4 of FIG. 3.

Referring now to the drawings, particularly FIG. 1, there is illustrated a heater unit in accordance with the invention, designated generally by the numeral 10, and a pot designated generally by the numeral 12 in position on the heater unit. The heater unit 10 has a somewhat conventional housing 14 enclosing the operational components of the heating unit.

Turning to FIG. 2, the heating unit includes a generally pan shaped housing portion 16 made of a metal or the like, such as stainless steel, and a heating element 18 mounted within the housing 16. The heating element is covered by a perforated plate or grating 20 having a raised conical portion 21 in the center thereof, surrounded by a generally annular flat supporting surface. This is to accommodate or more particularly adapt the unit to accommodation of the pot 12 which has a depression 22 in the bottom thereof, as shown in FIG. 4. With this arrangement, and the surrounding cup like housing portion in combination, only a pot of a particular configuration will be accommodated on the unit. This prevents or discourages the placement of cups, glasses and other type of containers on the heater unit.

The heating element, as best seen in FIG. 2, has a generally circular configuration with the ends thereof projecting outwardly as seen in FIG. 4 through an opening 24 in the cup like shell or housing 16. A support bracket 26 is secured to the housing 16 and extends outwardly beyond the opening 24. The heating element 18 is secured by a clamp 28 and screw 36 into a pivot bracket 30 and pivoted by means of pins 32 in the support bracket 26. An actuating arm 34 is secured by screw 36 to the pivot bracket at the end of the heating element. This actuating arm extends downward and engages a counterweighted actuating lever 38 pivotally mounted by a pivot pin 40 in a generally U-shaped downwardly opening channel 42, which is secured such as by a rivet 44 or other suitable means to the underside of the cup like housing 16. A pin 46 above pivot pin 40 engages the end of the lever 34 to define a cooperative engagement or relationship between the pivotally mounted heated element and the counterweighted actuating arm 38.

Figure 5:
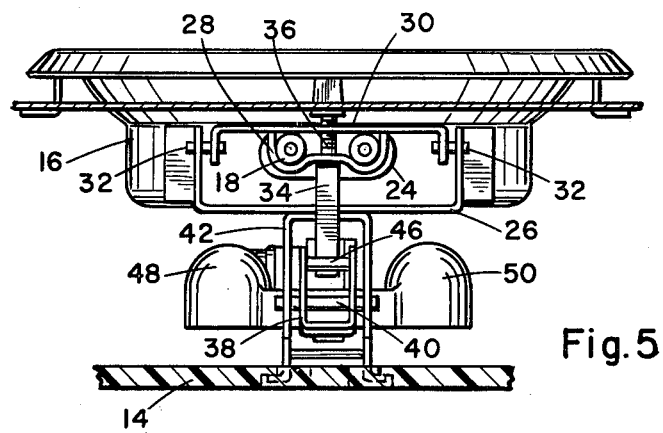
FIG. 5 is a sectional view taken on line 5—5 of FIG. 4.

As best seen in FIG. 5, a counterweight unit comprising of a pair of connected weights 48 and 50 are mounted on the outer end of the lever 38 to counterweight the heating unit 18. An actuating tab 39 on the end of the lever engages an actuating button 52 of a switch 54. The switch 54 is secured to the downwardly opening channel 42. With this arrangement, upward movement of the lever 38 under the action of a weight on the heating element 18 actuates the switch 54 to complete this circuit.

The mass or weight of the weights 48 and 50 are selected to bear a particular relationship to the contents or weight of the contents of the pot 12. Preferably this relationship is such that the pot 12, being a two cup pot for example, the heating element or heating circuit can be actuated by one cup of liquid contained in the container 12. Adjustments can be made in the mechanism by means of the weights and the like for accommodating different predetermined minimum weights within the container.

The unit also includes a thermo-switch 56 which is connected in series with the pressure responsive switch 54 in the circuit of the heating unit. This thermo-switch 56 is mounted in a suitable manner to the bracket 42 and is responsive to a predetermined excessive temperature of the unit to interrupt the electrical circuit to the unit.

The unit also may include an indicator light 58 for indicating when the circuit has been activated and the unit is turned on.

Figure 6:
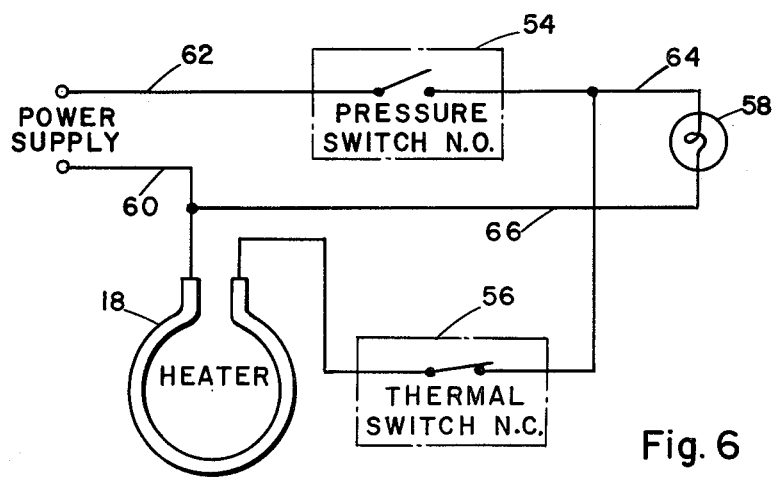
FIG. 6 is a diagram of the electrical system.

Turning to FIG. 6 of the drawing, a circuit is illustrated wherein the unit is connected into a power supply with a conductor 60 connecting one side of the power supply to the heating element 18 and a second conductor 62 connecting the circuit with switches 54 and 56 in series with the other side of the heating element. The indicator light 58 is connected across the conductors downstream of the pressure responsive switch 54 by means of conductors 64 and 66. Thus, when the pressure switch has been activated, the light 58 will illuminate indicating that the circuit has been activated.

The present invention was devised to provide optimum safety by means of a number of features discussed above. Thus, the unit is adapted to accommodate a container having a particular configuration that will accommodate the conical shaped upward protrusion in the heating element. The counterweight acting against the pivotal movement of the heating element is adapted to respond to a predetermined minimum amount of liquid within the container 12. With the minimum amount of liquid within the container, the counterweight will be overcome and the switch 54 activated, thus activating the circuit. Upon activation of the circuit, should the liquid within the pot boil down to a level below the predetermined minimum necessary to activation of the circuit, the masses of the counterweight will overcome the mass of the liquid in the container and thus pivot the lever arm 38 downward and away from the switch button 52, thus permitting the switch to open and break the circuit. Thus, the heating unit is then deactivated. Should this fail, however, the thermoresponsive switch 56 being in a position to sense a predetermined minimum temperature will act to interrupt the circuit should a certain dangerous level of temperature be reached within the unit. The thermoswitch is preferably of the type that is automatically returned to its normally closed position upon a cooling of the surrounding temperature.

Thus, from the above description, it is seen that I have provided a novel and unique heating unit responsive to a predetermined minimum quantity of liquid within a container and responsive to excess of heating of the unit.

Having described our invention, we now claim:

1. A portable electrical heating unit for heating a predetermined minimum quantity of material in a container, comprising:
   a stationary housing,
   an electrical heating element including an annular planar support surface surrounding an upwardly extending protrusion, for supporting a predetermined container,
   pivot means pivotally supporting said heating element on said housing,
   an electric circuit for connecting a source of electrical power to said heating element, said circuit including a weight responsive switch responsive to a predetermined minimum weight on said said support surface of said heating element for closing said switch, and a thermal switch in said circuit in series with said weight responsive switch and responsive to a predetermined temperature for interrupting said circuit,
   a counterweight pivotally mounted below said heating element and connected to oppose weight supported on said heating element, said weight responsive switch being positioned to be actuated by movement of said counterweight in opposition to said predetermined minimum weight on said heating element, and
   a container having a depression in the bottom for accommodating said upwardly extending protrusion.

2. The heating unit of claim 1, wherein said frame includes a cup shaped housing portion including upstanding walls surrounding and extending above said heating element,
   said upstanding walls serving to limit the size and shape of the bottom of a container that can rest on said heating element.

3. The heating unit of claim 2, wherein said frame includes a downwardly opening channel member secured to the bottom of said cup shaped housing,
   said counterweight lever pivotally mounted in said channel, a counterweight mounted on one end of said lever, and
   connecting means for connecting the other end of said lever to said heating element.

4. The heating unit of claim 3, wherein said cup shaped housing includes an opening in one side thereof,
   a pivot support bracket secured to said housing adjacent said opening,
   a clamp pivotally mounted in said pivot support bracket, and
   said heating element secured in said clamp.

5. The heating unit of claim 4, wherein said counterweight lever is generally L-shaped and is pivotally mounted at the juncture of the arms thereof, and
   said connecting means comprises a pin on said lever, and an arm on said clamp engaging said pin.

6. The heating unit of claim 5, wherein said counterweight comprises a pair of masses connected together and disposed on each side of said lever.

* * * * *